United States Patent [19]

Hutton et al.

[11] Patent Number: 5,277,224
[45] Date of Patent: Jan. 11, 1994

[54] FIVE VALVE MANIFOLD FOR USE WITH A PRESSURE SENSING APPARATUS

[75] Inventors: Peter B. Hutton; Edward R. Coleman, both of Calgary, Canada

[73] Assignee: Century Industries Inc., Calgary, Canada

[21] Appl. No.: 24,758

[22] Filed: Mar. 2, 1993

[51] Int. Cl.$^5$ .............................................. F16K 11/20
[52] U.S. Cl. .................................. 137/597; 137/552; 137/884
[58] Field of Search ................ 137/594, 597, 884, 552

[56] References Cited

U.S. PATENT DOCUMENTS

| | | | |
|---|---|---|---|
| 1,797,591 | 3/1931 | Sartakoff | 137/597 |
| 2,804,879 | 9/1957 | Hanson | 137/597 |
| 2,871,881 | 2/1959 | Hewson | 137/597 |
| 3,450,157 | 6/1969 | Hewson | 137/595 |
| 3,633,618 | 1/1972 | Blackmore | 137/597 |
| 3,768,511 | 10/1973 | Bias | 137/597 |
| 3,894,559 | 7/1975 | DePuy | 137/595 |
| 4,092,865 | 6/1978 | Strybel | 73/756 |
| 4,319,492 | 3/1982 | Hewson et al. | 73/756 |
| 4,602,657 | 7/1986 | Anderson, Jr. et al. | 137/595 |
| 4,672,728 | 6/1987 | Nimberger | 137/884 |
| 4,711,268 | 12/1987 | Coleman | 137/597 |
| 4,977,917 | 12/1990 | Adams | 137/597 |
| 5,036,884 | 8/1991 | Miller et al. | 137/597 |
| 5,048,569 | 9/1991 | Stoll et al. | 137/884 |
| 5,117,867 | 6/1992 | Adams | 137/597 |
| 5,209,258 | 5/1993 | Sharp et al. | 137/597 X |

FOREIGN PATENT DOCUMENTS 990102 6/1976 Canada .
1254108 5/1989 Canada .

Primary Examiner—Stephen M. Hepperle
Attorney, Agent, or Firm—Stevens, Davis, Miller & Mosher

[57] ABSTRACT

A five valve manifold for use with a pressure sensing apparatus is disclosed. It has an integral body having a first face, a second face, parallel with the first face. A peripheral wall section, spans the distance between the first and second face sections. The distance is smaller than at least one of the width and the length of the second face section. A passage system within said body and includes a plurality of mutually intercommunicating passages extending from one said face to the other. A set of five valves operates selective opening and closing of the passages. The centers of the instrument outlets at one face are suited to new type of "smart" pressure transmitters, while the inlet ports at the other correspond to the usual spacing used in the industry. The invention eliminates the use of a so-called parallel flange used by the manufacturers of pressure transmitters to accommodate the difference in the centers of connecting ports of the instrument from that previously used by the industry.

6 Claims, 4 Drawing Sheets

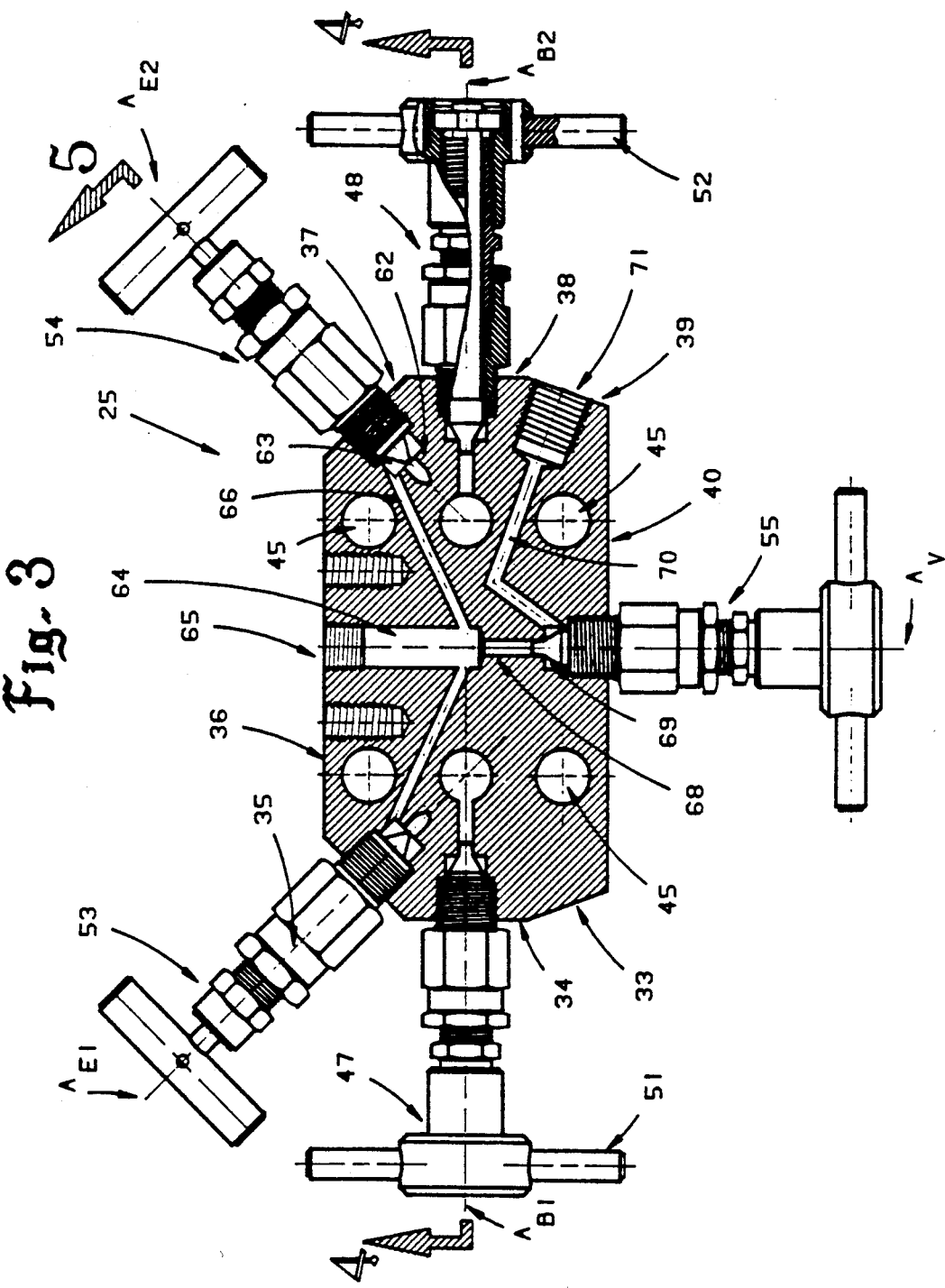

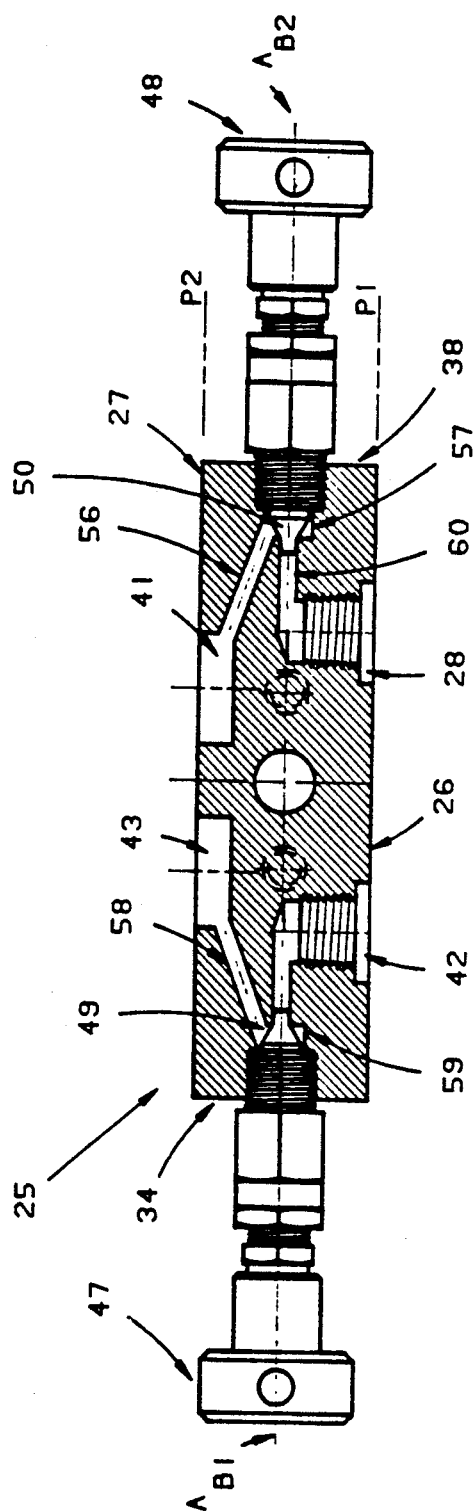
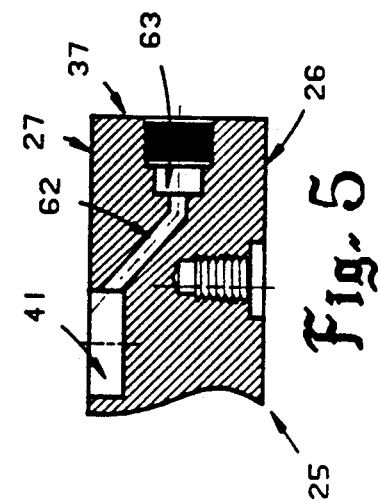
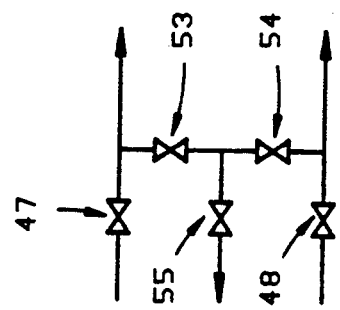

FIVE VALVE MANIFOLD FOR USE WITH A PRESSURE SENSING APPARATUS

BACKGROUND OF THE INVENTION

The present invention relates to a five valve manifold for use with a pressure sensing apparatus.

Prior art pertaining to the present invention is represented, for instance, by Canadian patent 990,102 (Bias); by Canadian patent 1,254,108 (Nimberger); by U.S. Pat. No. 3,450,157 (Hewson) and by U.S. Pat. No. 4,711,268 (Coleman).

Prior art and the present invention will be described with reference to the accompanying diagram drawings wherein:

BRIEF DESCRIPTION OF THE DRAWINGS

FIG. 3 is a cross-sectional view taken along the section line III—III of FIG. 2;

FIG. 4 is section IV—IV of FIG. 3;

FIG. 5 is section V—V of FIG. 3;

FIG. 6 is simplified flow diagram of a typical five valve manifold.

PRIOR ART

Fluid pipeline systems often require the measurement of pressure or flow characteristics within a given section of a pipeline.

This is usually achieved by different types of pressure sensing devices. Electronic pressure transmitters sensing pressure characteristics are prevailing at two predetermined points of a given pipeline preferred in the art.

When operating a pressure transmitter, it is important that five modes of operation be readily set by the manifold.

1) A direct communication of an inlet of a high pressure process flow to a high pressure instrument flow of the sensor;

2) A direct communication of the low pressure process flow to a low pressure instrument flow of the sensor;

3) An equalized pressure whereby either the low or the high process fluid pressure is directed to both the high and low pressure instrument inlet;

4) A state in one of the high and low pressure inlets is vented while the other is connected to the high or low pressure instrument inlet (for measuring absolute pressure value at either the low or the high pressure point of the pipeline); and 5) A state whereby both the high and the low pressure process fluid is vented at the manifold (resulting in a zero pressure at the transmitter).

When a new type of so-called "smart" pressure transmitters (capable of transmitting both relative and absolute pressure values) was introduced, the size of the transmitters was substantially reduced. This resulted in the reduction of the distance between the centres of delivery ports in the transmitter housing from the previous industry standard of 2⅛" to 1¼".

In order to facilitate the replacement of the existing old pressure transmitters with the "smart" version, the manufacturers of the transmitters had to meet the demand of industry to accommodate the existing 2⅛" centres of the process fluid inlets.

Figure 1:
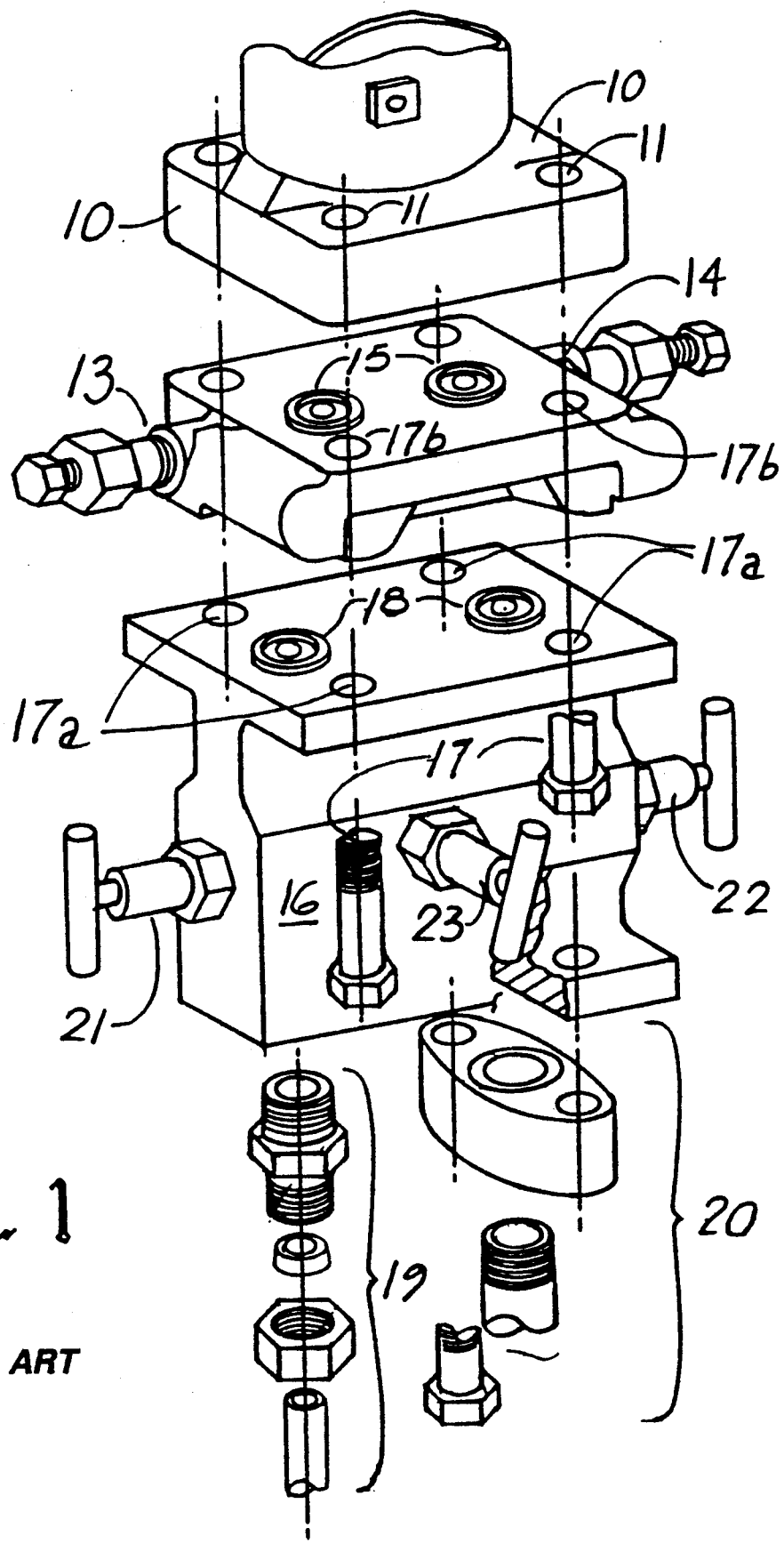
FIG. 1 is a simplified exploded perspective view of a typical prior art arrangement.

The manufacturers of the "smart" pressure transmitters solved this problem by an arrangement shown in FIG. 1.

Reference numeral 10 designates a "smart" pressure transmitter the structure of which is not a part of the present invention. In a typical arrangement, the transmitter 10 is provided with four threaded holes 11. A so-called co-planar flange 12 which provides the diverting function of the 1¼" centres at the transmitter housing 10 to the existing spacing of 2⅛" at the high and low pressure inlets of system fluid. The co-planar flange 12 is thus in fact a diverting attachment to the new transmitter 10. It also provides drain or vent valves 13 and 14 for high pressure and low pressure sides of the transmitter. The sealing between the co-planar flange 12 and the transmitter housing 10 is accomplished by the use of two seal rings 15 which are spaced at 1¼" centres corresponding to the centres of inlet ports of the transmitter 10.

A manifold 16 is attached to the co-planar flange 12 by means of four mounting bolts of which only two bolts 17 are shown in FIG. 1. The bolts 17 pass through the bolt passages 17a in the upper part of the manifold 16, through bolt passages 17b in the coplanar flange 12 and into the threaded holes 11.

Further two seal rings 18, disposed at the 2⅛" centres, are disposed between the manifold 16 and the co-planar flange 12 to provide a hermetical engagement between the two. Secured to the underside of the manifold body 16 are process fluid inlet assemblies 19 or 20. Two different inlet assemblies are shown in FIG. 1. Since they are well known in the art, they do not have to be described in detail.

Reference numeral 21 and 22 designates so-called block or shut-off valves adapted to block the passage of process fluid to the high and low pressure sections of the transmitter housing 10. An equalizer valve 23 is designed to interconnect the high and low pressure passages with each other. The drain or vent valves 13 and 14 serve the purpose of venting or draining either the high or the low pressure processed fluid or both.

While the introduction of the coplanar flange 12 complied with the added requirement for evacuation of the respective fluid through the said vent/drain valves and diversion of process flow, it also added a significant disadvantage.

In particular it adds two more potential leakage points. The duplication of the standard seal rings 15—15, 18—18 enhances the error factor for leakage and inaccurate measurement by the transmitter 10. As mentioned above, the assembly of the transmitter 10, coplanar flange 12 and the manifold 16 is made by four bolts such as bolts 17. Tightening sequence and torque values of the bolts 17 are critical to ensure uniform compression of the seal rings 15, 18. The introduction of the coplanar flange 12 greatly enhances the risk of failure of uniform compression and thus presents greater risk of leakage of the process fluid between the mating surfaces.

Furthermore, the arrangement requires a substantial space between the process fluid inlet assemblies and the inlet ports of the pressure transmitter.

In addition, the arrangement is relatively expensive to produce and maintain due to a relatively large number of parts required.

SUMMARY OF THE INVENTION

It is an object of the present invention to provide an improvement in the above manifolds which would secure reliable operation in use in absolute pressure or relative pressure transmission. Another object is to improve reliability of the device. A still further object is to reduce the cost of manufacture of the manifold of this type. A yet another object is to substantially reduce the height of the manifold body to thus reduce the space required for the manifold.

In general terms, the present invention provides a five valve manifold for use with a pressure sensing apparatus, said manifold comprising, in combination:

(a) an integral body having a first face section, a second face section, generally parallel with the first face section; and a peripheral wall section, the distance between the first and second face sections being smaller than at least one of the width and the length of the second face section;

(b) a passage system disposed within said body and including a plurality of mutually intercommunicating passages;

(c) said passage system including:
  (i) a high pressure inlet for a process flow;
  (ii) a high pressure outlet for a gauge flow;
  (iii) a low pressure inlet for the process flow;
  (iv) a low pressure outlet the instrument flow;
  (v) a vent outlet;

(d) said high and low pressure inlets being disposed in said first face section, said high and low pressure outlets being disposed in said second face section;

(e) said second face section being sealingly compatible with respect to an inlet portion of a housing of a respective pressure sensing apparatus to provide a hermetical sealing engagement therewith, while communicating said high and low pressure outlets with respective inlet portions of the pressure sensing apparatus;

(f) selectively operable valves, each having a valve stem portion disposed inside the body and carrying a valve member, and an actuating stem portion projecting outwardly from the peripheral wall portion of the body;

(g) said actuating stem portions being spaced from each other about the periphery of the body and being all located within a space limited by a first reference plane generally coincident with said first face section, and by a second reference plane generally coincident with said second face section; and (h) a plurality of mounting bolt passages disposed around the periphery of the body, extending each from the first to the second face section and generally perpendicular to the face sections.

According to a further feature of the present invention, the axes of the actuating stem portions are generally parallel with the second face section and are located in a general coincidence with an intermediate reference plane generally parallel with said second face and generally equidistantly spaced from the first and second face sections. According to still another feature of the present invention, the spacing between the high and low pressure inlets is different from that of the high and low pressure outlets.

The arrangement of the present invention presents a unique and strategic disposition of the passages through the body of the manifold. The high and low pressure outlets are each a circular open end of a respective high and low pressure cylindric outlet chamber defining a recess in said second face section. The depth of each recess is less than one-half the distance between the first and second face sections. The cross-sectional area of each recess at said open end is a multiple of the cross-sectional area of any one of said passages. The high pressure outlet chamber communicates with one end of a straight discharge portion of a high pressure passage forming a part of said passage system. The other end of said discharge portion is in a permanent communication with a cylindric shut-off valve chamber of a high pressure shut-off valve. Similarly, the low pressure outlet chamber communicates with one end of a straight discharge portion of a low pressure passage forming a part of said passage system. The other end of said discharge portion is in a permanent communication with a cylindric shut-off valve chamber of a low pressure shut-off valve. Each of said shut-off valve chambers of the block or shut-off valves further communicates with one end of a respective one of high or low pressure straight inlet portions of the high and low pressure passage. The other ends of straight inlet portions terminate each at said high and low pressure inlets, respectively.

The inlet and discharge portions of each of the high and low pressure passage define, at the respective shut-off valve chamber, an acute angle. Each of the high and low pressure straight inlet portions is co-axial with the respective shut-off valve chamber. Mounted in each said valve chamber is a shut-off valve. The valve member at the end respective valve stem portion of each shut-off valve is compatible with said one end of the respective inlet portion for selectively blocking or opening the communication between the valve chamber and the inlet portion.

DETAILED DESCRIPTION OF A PREFERRED EMBODIMENT

A preferred exemplary embodiment of the present invention will now be described in detail with reference to FIGS. 2-5, where the corresponding parts are designated with the same reference numerals.

Figure 2:
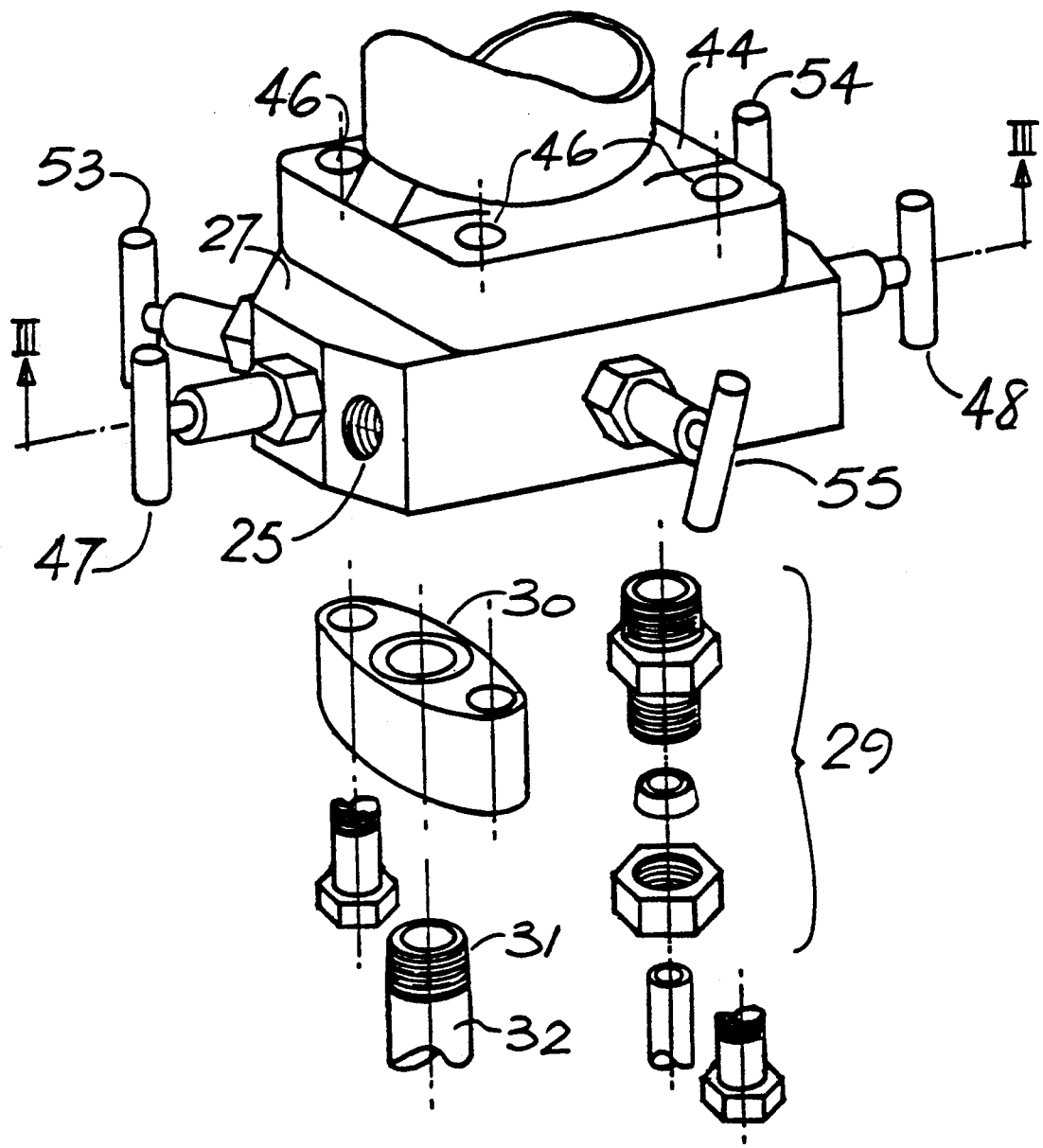
FIG. 2 is a simplified perspective view of an arrangement according to the present invention.

The five valve manifolds of the present invention comprises an integral body 25. The body has a first face section 26 and a second face section 27. As best seen from FIG. 4, the first and second face sections 26 and 27 are generally parallel with each other. The first face section 26 is provided with a threaded high pressure inlet 28 which is adapted to receive a connecting assembly such as assembly 29 shown in FIG. 2. As an alternative, arrangement can be made for mounting bores which would be compatible with a so called football flange 30 having a threaded hole for receiving the threaded end 31 of a low pressure pipe 32. For convenience figures other than FIG. 2 show an arrangement which is only suitable for connection with the assembly 29. The periphery of the body 25 is comprised of wall portions (FIG. 3) 33-40. The wall portions 33-40 are summarily referred to as "a peripheral wall section". FIG. 3 shows that the peripheral wall section defines a slightly elongated octagon, it being understood that the actual configuration of the contour of the peripheral wall section is optional. The distance between the first and second faces 26, 27 is smaller than the width (distance between wall portions 36 and 40) or the length (the distance between the wall portions 34, 38) of the body 25.

Within the body 25 is disposed a passage system which includes the already mentioned high pressure inlet 28 for the process flow, a high pressure outlet 41 having the shape of a shallow cylindric recess in the second face section 27, a low pressure inlet 42 for the process flow and a low process outlet 43 having a structure similar to that of the high pressure outlet 41. The spacing of the high and low pressure outlets 41, 43 corresponds to the respective spacing of the instrument housing 44 (shown only in FIG. 2). In the embodiment shown, the spacing between the cylindric chambers 41 and 43 is smaller than that between the inlet ports 28, 42. The spacing is adjusted to the standard tolerance in the industry.

The second face section 27 is sealingly compatible with respect to the inlet portion of the housing 44. The sealing compatibility is due to seal rings (not shown) and by the provision of mounting holes or passages 45 the spacing of which matches that of the corresponding passages in the housing 44, to receive mounting bolts 46. The passages 45, of course, do not interfere with any part of the passage system of the manifold. The sealing engagement must be fully hermetical to provide the required accuracy of measurement by the respective instrument.

The manifold of the present invention is provided with a total of five valves. Each valve is of a known structure which includes a valve stem portion disposed inside the body 25 and carrying a valve member. Referring, for instance, to FIG. 4, the left-hand valve designated with reference number 47. It is a low pressure block valve. Number 48 designates a high pressure block valve. The valves are of identical structure each carrying, at the free end of the inside valve stem, a conical valve member 49, 50. Each valve has an actuating stem portion projecting outwardly from the wall portions 34 and 38 in opposite directions. The free end of each actuating stem portion is provided with a handle 51, 52, as is well known in the art.

In addition to the block valves 47, 48, the manifold body is provided with two equalizer valves 53, 54. One more valve 55 is a vent valve as will be described later. All valves have a structural configuration generally identical to that of valves of 47, 48.

It can be seen on review of FIG. 3 that the actuating stem portions of the valves 47, 48, 53-55 are spaced from each other about the periphery of the body. They are all located (FIG. 4) within a space limited by a first reference plane $P_1$ and a second reference plane $P_2$, the two planes being generally coincident with the first and second face sections 26, 27.

It is noteworthy that the axes $A_{B1}$, $A_{B2}$, $A_{E1}$, $A_{E2}$, $A_{V2}$, which present the axes of actuating stem portions of the respective valves, are all generally parallel with the reference planes $P_1$ and $P_2$.

It can also be observed from FIG. 4 that the preferred location of all axes A is a position generally equidistant from both of the planes $P_1$ and $P_2$.

The spacing between the high pressure outlet 41 and the low pressure outlet 43 is different from the high pressure inlet 28 and the low pressure inlet 42, to accommodate the usual centers of the connecting piping at the first face section 26 and of the housing 44 "smart" transmitter at the second face section 27.

Referring now back to the high pressure outlet 41 as shown in FIG. 4, the outlet 41 has the shape of a cylindric chamber. The chamber defines a recess in the second face section 27. The depth of the recess is only a fraction of the distance between the face sections 26 and 27. The cross-sectional area of chamber 41 is a multiple of that of the passages within the body as will be described hereafter.

In particular, reference numeral 56 designates a straight discharge portion. Its one end is in a permanent communication with the high pressure outlet chamber 41. The other end of the discharge portion 56 is in a permanent communication with a high pressure valve chamber 57 in which is disposed the valve member 50. Similarly, the cylindric chamber of the low pressure outlet 43 communicates with a straight discharge portion 58 extending between the low pressure outlet 43 and a cylindric valve chamber 59 of the low pressure block valve 47, in which is disposed the valve member 49. The valve chamber 57 further communicates with a straight high pressure inlet portion 60 whose end remote from the chamber 57 is in a permanent communication at the high pressure inlet 28 as best seen in FIG. 4.

At the opposite side of the manifold, the valve chamber 59 communicates with the low pressure inlet 42 by a straight low pressure inlet portion 61. Each of the inlet portions 60 and 61 defines, at its communication with the respective chamber 57 or 59, a seat for the valve member 50, 49 of the respective shut-off or block valve. Thus, the manipulation of the valves 47 and 48 results in a selective blocking or opening of the high and low pressure fluid passage from the inlets 28, 42 to the outlets, 41, 43.

Reference should now be had to the cross-sectional view to FIG. 5. It shows that the cylindric chamber of the high pressure outlet 41 further communicates, by an equalizer passage 62, with a cylindric valve chamber 63 of the equalizer valve 54. The part of the passage 62 just before the valve chamber 63 is angled to bring the port of the passage 62 at the chamber 63 into coaxial arrangement with the chamber 63. FIG. 5 has the valve 54 removed from chamber 63 for the sake of clarity. The manipulation of the high pressure equalization valve 54 may selectively open or close the passage 62 and thus the communication with the high pressure outlet chamber 41. The valve chamber 63 is further in a permanent communication with an equalizer chamber 64 which is provided with a threaded-in plug 65. The high pressure equalizer passage extending between the chambers 63 and 64 is designated with reference number 66.

The arrangement at the opposed valve chamber 67 of the low pressure equalizer valve (FIG. 3) is identical to that described with reference to the chamber 63 and is therefore not described in detail.

The equalizer chamber 64 communicates via a short straight coaxial passage 68 with a valve chamber 69 of the vent valve 55. Thus, the conical valve member of the vent valve 55 may selectively close or open the communication between chambers 64 and 69. The valve chamber 69 is in permanent communication with an angled vent passage 70 communicating the chamber 69 with a vent outlet 71. The vent passage 70 of the embodiment shown is angled to by-pass the mounting opening 45.

In operation, any of the five desired mutual positions of the manifold can be achieved. For instance, if it is desired to measure the absolute pressure value at the high pressure inlet, the block valve 47 is closed, the equalizer valve 53 and vent valve 55 open and the equalizer valve 54 closed. If it is desired to vent the high pressure portion of the instrument, the valve 48 is closed and the valves 54 and 55 open. If it is desired to provide both sides of the transmitter with the same pressure (which may be desirable to calibrate the instrument) the valves 48, 54 and 53 are open and the valves 47 and 55 closed. The entire venting of the transmitter is achieved by closing the block valves 47, 48 and opening valves 53, 54 and 55.

It will be observed that the present invention provides a simple, reliable and space saving five valve manifold. Many other embodiments of the present invention exist which differ from the embodiment disclosed without departing from the present invention. Accordingly, we wish to protect by letters patent which may issue on the present application all such embodiments as fairly fall within the scope of our contribution to the art.

We claim:

1. A five valve manifold for use with a pressure sensing apparatus, said manifold comprising in combination:
   (a) an integral body having a first face section, a second face section, generally parallel with the first face section; and a peripheral wall sectional, the distance between the first and second face sections being smaller than at least one of the width and the length of the second face section;
   (b) a passage system disposed within said body and including a plurality of mutually intercommunicating passages;
   (c) said passage system including:
      (i) a high pressure inlet for the process flow;
      (ii) a high pressure outlet for the instrument flow;
      (iii) a low pressure inlet for the process flow;
      (iv) a low pressure outlet for the instrument flow;
      (v) a vent outlet;
   (d) said high and low pressure inlets being disposed in said first face section, said high and low pressure outlets being disposed in said second face section;
   (e) said second face section being sealingly compatible with respect to an inlet portion of a housing of a respective pressure sensing apparatus to provide a hermetical sealing engagement therewith, while communicating said high and low pressure outlets with respective inlet portions of the pressure sensing apparatus;
   (f) selectively operable valves, each having a valve stem portion disposed inside the body and carrying a valve member, and an actuating stem portion projecting outwardly from the peripheral wall portion of the body;
   (g) said actuating stem portions being spaced from each other about the periphery of the body and being all located within a space limited by a first reference plane generally coincident with said first face section, and by a second reference plane generally coincident with said second face section; and
   (h) a plurality of mounting bolt passages disposed around the periphery of the body, extending each from the first to the second face section and generally perpendicular to the face sections.

2. The manifold as recited in claim 1, wherein the axes of the actuating stem portions are generally parallel with the second face section and are located in a general coincidence with an intermediate reference plane generally parallel with said second face and generally equidistantly spaced from the first and second face sections.

3. The manifold as claim 1, wherein the spacing between the high and low pressure inlets is different from that of the high and low pressure outlets.

4. The manifold as recited in claim 2, wherein:
   (a) the high and low pressure outlets are each a circular open end of a respective high and low pressure cylindric outlet chamber defining a recess in said second face section, the depth of each recess being less than one-half the distance between the first and second face sections, the cross-sectional area of each recess at said open end being a multiple of the cross-sectional area of any one of said passages;
   (b) the high pressure outlet chamber communicates with one end of a straight discharge portion of a high pressure passage forming a part of said passage system, the other end of said discharge portion being in a permanent communication with a cylindric shut-off valve chamber of a high pressure shut-off valve;
   (c) the low pressure outlet chamber communicates with one end of a straight discharge portion of a low pressure passage forming a part of said passage system, the other end of said discharge portion being in a permanent communication with a cylindric shut-off valve chamber of a low pressure shut-off valve;
   (d) each of said shut-off valve chambers of the high and low pressure shut-off valves further communicating with one end of a respective one of high and low pressure straight inlet portions of the high and low pressure passage, respectively, the other ends of the respective straight inlet portions terminating at said high and low pressure inlets, respectively;
   (e) the inlet and discharge portion of each of the high and low pressure passage defining, at the respective shut-off valve chamber, an acute angle, each of said high and low pressure straight inlet portions being co-axial with the respective shut-off valve chamber; and
   (f) each said valve chamber is provided with a shut-off valve, the valve member at the end of the respective valve stem portion being compatible with said one end of the respective inlet portion for selectively controlling the communication between the valve chamber and the inlet portion.

5. The manifold as recited in claim 4, wherein:
   (a) each said recess further communicates with a first end of a respective equalizer passage forming a part of said passage system;
   (b) the other end of the equalizer passage being in a permanent communication with a respective cylindric equalizer valve chamber;
   (c) each equalizer valve chamber further communicating with a transverse passage forming a part of the passage system and permanently communicating the respective equalizer valve chamber with an equalizer chamber disposed generally centrally of the body;
   (d) each equalizer valve chamber is provided with an equalizer valve, the valve member at the end of each respective valve stem portion being compatible with an inlet of said transverse passage to selectively close or open the respective transverse passage at the respective equalizer valve chamber;
   (e) the valve stem portions of the equalizer valves being disposed at an angle to each other and to any one of the valve stem portions of the shut-off valves.

6. The manifold as recited in claim 5, further comprising a vent valve, the valve member of the vent valve being adapted for selectively closing or opening a vent passage communicating the equalizer chamber to said vent outlet, the axis of the vent valve stem being at an angle to the axes of any of the shut-off and equalizer valves.

* * * * *